Patented Sept. 14, 1937

2,092,944

UNITED STATES PATENT OFFICE 2,092,944

MANUFACTURE OF WATER SOLUBLE CHLORITES

George Paul Vincent, Niagara Falls, N. Y., assignor to The Mathieson Alkali Works, Inc., New York, N. Y., a corporation of Virginia No Drawing. Application August 15, 1934, Serial No. 739,887

9 Claims. (Cl. 23—85)

My invention relates to improvements in the manufacture of water soluble chlorites, sodium chlorite and calcium chlorite for example, by methods involving reaction between chlorine dioxide, an alkaline material corresponding to the chlorite to be made and a reducing agent, in an aqueous medium. Preferably the alkaline material is a free base.

It has hitherto been proposed, for example, to form sodium chlorite by reaction between chlorine dioxide and sodium peroxide and to form calcium chlorite by reaction between chlorine dioxide and calcium peroxide, with liberation of oxygen in each instance. These reactions are necessarily limited in application because of the fact that the cation of the peroxide becomes the cation of the chlorite.

I have found that improved efficiencies and economies can be obtained by using two reagents, an alkaline material corresponding to the chlorite to be made and an independent reducing agent. By so using two independent reagents, each can be selected with respect to its particular function in the reaction without reference to the function of the other. In one aspect this enables the use as reducing agents of inexpensive reagents, an important practical economy. Efficiencies corresponding to chlorine dioxide conversions as high as 90% or higher can be obtained.

As noted above, the alkaline material is preferably a free base. Alkaline carbonates appear to work in a manner somewhat similar to the free base, NaOH or Ca(OH)$_2$, for example, and may be used in the application of the invention. Efficiencies are better, however, when using a free base.

I have found sulfurous reducing agents, that is, reducing agents containing sulfur, to be advantageous in the application of my invention. Sulfurous reducing agents which I have tried and found to be useful include elemental sulfur and alkaline sulfites such as sodium sulfite and calcium sulfite. The following summarized type reactions will illustrate my invention as applied using such reducing agents:

(1) 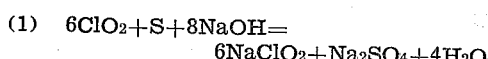

(2) 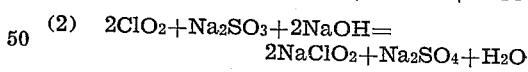

The following examples of embodiments of my invention in which a sulfurous reducing agent is used will further illustrate its application.

*Example 1.*—2.5 parts (by weight) of chlorine dioxide, in a mixture with air in which (at standard conditions) the partial pressure of the chlorine dioxide approximated 10-25 mm. (of mercury), were introduced into a solution of 1.9 parts of sodium hydroxide in 100 parts of water containing 20 parts of sodium sulfite while maintaining the reaction mixture at a temperature approximating 2° C. 81% of the reacting chlorine dioxide formed chlorite, sodium chlorite, and 14% of the reacting chlorine dioxide was converted to chloride.

*Example 2.*—2.5 parts chlorine dioxide, in a mixture with air in which the partial pressure of the chlorine dioxide approximated 10-25 mm. were introduced into 100 parts of water containing 25 parts of lime and 15 parts of finely divided elemental sulfur while maintaining the reaction mixture at a temperature approximating 20° C. 27% of the reacting chlorine dioxide formed chlorite, calcium chlorite, without formation of chlorate.

In referring to "reacting chlorine dioxide" in the foregoing examples, I refer to that part of the total chlorine dioxide supplied which was absorbed in the reaction mixture as distinguished from that part of the chlorine dioxide which escaped from the mixture as a gas, together with the air forming part of the mixture in which the chlorine dioxide was supplied to the reaction. For example, in the embodiment of my invention as carried out by me according to the first of the foregoing examples, 97% of the chlorine dioxide introduced into the reaction mixture was absorbed therein, 81% of this 97% forming chlorite. In any particular case, the proportion of chlorine dioxide absorbed and the proportion escaping depends in large measure upon the manner of introduction, the effective contact between the total gas mixture and the liquid reaction mixture, with which my present invention is not concerned, and I have therefore stated the recoveries of chlorite with reference to the reacting chlorine dioxide.

In the application of my invention, either the alkaline material or the sulfurous reducing agent or both may be present in the reaction mixture in solution or in suspension or partly in solution and partly in suspension.

It is important, however, in the application of my invention that the alkaline material and particularly the sulfurous reducing agent be well distributed through the reaction mixture. Maximum distribution is of course obtained where the reagent is in solution. Where the reagent is in suspension, it should be present in an extreme state of subdivision and sufficient agitation should be provided to maintain the suspension substantially uniform.

Referring more particularly to suspended sulfurous reducing agents, distribution of the reagent through the reaction mixture is important in that the formation of chlorate, rather than chlorite, tends to increase as the effective distribution of the reducing agent diminishes.

The maintenance of particular temperatures does not appear to be important in the application of my invention. The reaction can be carried out, for example, at temperatures ranging from the freezing temperature to the boiling temperature of the reaction mixture involved. The use of specific temperatures, however, for each reducing agent employed, appears to yield the highest efficiencies. The temperatures employed in the examples are considered advantageous.

I have claimed the use as separate reagents of an alkaline material corresponding to the chlorite to be made and independent carbonaceous reducing agents, in my co-pending application filed August 15, 1934, Serial No. 739,940.

I claim:

1. A method of making water soluble chlorites of metals which form bases, which comprises introducing gaseous chlorine dioxide into an aqueous solution of a free base corresponding to the chlorite to be made, and a finely divided sulphur.

2. A method of making water soluble chlorites of metals which form bases, which comprises introducing gaseous chlorine dioxide into an alkaline aqueous medium containing distributed therethrough an inorganic alkaline material corresponding to the chlorite to be made, and a finely divided sulfur.

3. A method of making water soluble chlorites of metals which form bases, which comprises introducing gaseous chlorine dioxide into an alkaline aqueous medium containing distributed therethrough an inorganic alkaline material corresponding to the chlorite to be made, and a reducing agent selected from the group consisting of elemental sulfur and inorganic sulfurous compounds.

4. A method of making water soluble chlorites of metals which form bases, which comprises introducing gaseous chlorine dioxide into an aqueous solution of a free base corresponding to the chlorite to be made, and a reducing agent selected from the group consisting of elemental sulfur and inorganic sulfurous compounds.

5. A method of making water soluble chlorites of metals which form bases which comprises introducing gaseous chlorine dioxide into an alkaline aqueous medium containing distributed therethrough an inorganic alkaline material corresponding to the chlorite to be made, and an inorganic sulfite.

6. A method of making water soluble chlorites of metals which form bases, which comprises introducing gaseous chlorine dioxide into an aqueous solution of a free base corresponding to the chlorite to be made, and an inorganic sulfite.

7. A method of making water-soluble chlorites of metals which form bases, which comprises introducing chlorine dioxide into an aqueous solution of a free base corresponding to the chlorite to be made, and finely divided sulfur.

8. A method of making water-soluble chlorites of metals which form bases, which comprises introducing chlorine dioxide into an aqueous solution of a free base corresponding to the chlorite to be made, and a reducing agent selected from the group consisting of elemental sulfur and inorganic sulfurous compounds.

9. A method of making water-soluble chlorites of metals which form bases, which comprises introducing chlorine dioxide into an alkaline aqueous medium containing distributed therethrough an inorganic alkaline material, corresponding to the chlorite to be made, and a reducing agent selected from the group consisting of elemental sulfur and inorganic sulfurous compounds.

GEORGE PAUL VINCENT.